3,355,398
CELLULAR POLYURETHANES PREPARED UTILIZING SODIUM BOROHYDRIDE AS A BLOWING AGENT
Robert E. Kass, Dayton, Ohio, assignor to The National Cash Register Company, Dayton, Ohio, a corporation of Maryland
No Drawing. Filed May 5, 1964, Ser. No. 365,166
6 Claims. (Cl. 260—2.5)

This invention relates to the manufacture of polyurethane foamed structures and more particularly to a process for making cellular polyurethane structures by reacting a polyol compound with each of a polyisocyanate and a specific foaming agent, sodium borohydride, novel to the polyurethane-foam-producing art.

Conventional methods of preparing polyurethane foamed structures comprise reacting a polyisocyanate and a compound having at least two reactive hydrogen atoms, most commonly a polyol, in the presence of a foaming agent. Heretofore-utilized foaming agents encompass a wide variety of materials; for example, water, carboxylic acids such as acetic, propionic, and lactic acids, and inert gases such as carbon dioxide or nitrogen, which are injected into the reaction mixture under pressure, low-boiling-point compounds such as the Freons, e.g., trichlorofluoromethane, compounds which decompose to form gases when subjected to heat, for example, azo-bis-isobutyronitrile, diazoaminobenzene, ammonium and sodium carbonate and bicarbonate, low-boiling-point solvents, and the like. A great number of these foaming agents are unacceptable under certain conditions because of their high vapor pressures and rapid volatilization, especially when heated. Such properties are particularly disadvantageous when the foaming agent is utilized with polyurethane-foam-producing materials under environmental pressures lower than atmospheric pressure; for example, one millimeter of mercury or less. Obviously, at these pressures the rate of volatilization of the high-vapor-pressure foaming agents would be increased tremendously, thus resulting in an excessive loss of the cell-forming gas into the surrounding atmosphere prior to and during the formation of the foamed structure.

The object of this invention is to provide a new and improved process of making polyurethane foamed structures.

A further object of this invention provides a process for preparing polyurethane cellular materials which utilizes sodium borohydride as the foaming agent.

Another object is to provide a process of making polyurethane foamed structures in which a polyol is reacted simultaneously with sodium borohydride to generate a cell-forming gas in situ, and a polyisocyanate to produce a polyurethane polymer which forms the cell structure of the final foamed product.

Still another object is to provide a new and improved process for producing polyurethane foamed structures which is particularly advantageous for use at pressures considerably lower than atmospheric pressure.

These and other objects of the invention will become apparent from the following detailed description.

In accordance with the present invention, there is provided a process for producing polyurethane foamed structures comprising mixing a polyisocyanate, a polyol, and a foaming agent, sodium borohydride, and allowing these ingredients to react to form the final foamed product. When these ingredients were mixed together, it was found, surprisingly, that the polyol underwent a dual reaction; that is, it reacted simultaneously with both the polyisocyanate and the sodium borohydride, to produce a polyurethane foamed product of uniform small cell size and excellent compressive strength. The reaction with the polyisocyanate produces a urethane polymer, and the reaction with the sodium borohydride generates hydrogen gas, in situ, to expand the polyurethane material into a foamed product.

The utilization of the reaction between the polyol and sodium borohydride to produce the cell-forming hydrogen gas, in situ, is highly advantageous in several respects. Not only is there a minimum weight and volume of the sodium borohydride required for the volume of gas evolved from this compound, but the polyol, itself, also evolved hydrogen gas during the reaction. Thus, it is relatively easy to incorporate the requisite small amount of sodium borohydride in any particular foam-forming composition, without appreciably altering the rheological properties, e.g., viscosity, etc., of the mix, to generate sufficient cell-forming gas, in situ, to prevent sagging or collapse of the polyurethane foamed structure during its entire period of formation. The sodium borohydride is particularly advantageous when used in the form of solid particles to produce foams at environmental pressures considerably below atmospheric pressure; e.g., one millimeter of mercury or lower. In its solid form, it has a very low vapor pressure and will not volatilize, even at pressures as low as $10^{-4}$ millimeters of mercury, prior to its reaction with the polyol. This eliminates the loss of the pore-forming hydrogen gas prior to the beginning of the reaction of the polyol and the polyisocyanate, which produces the polyurethane structure.

In the process of this invention, any of the wide variety of organic polyisocyanates disclosed in the prior art for producing polyurethane foamed structures can be employed. In general, substantially any reactive organic diisocyanate, triisocyanate, higher functional polyisocyanate, or mixtures thereof, such as the isomeric mixtures normally obtained during the production of the polyisocyanates, are included. They can be of any configuration, such as aromatic, aliphatic, aralkyl, alicyclic, heterocyclic, etc. Illustrative of the various polyisocyanates are ethylene diisocyanate, hexamethylene diisocyanate, p- and m-phenylene diisocyanate, benzene 1:3:5-triisocyanate, toluene-2,4- and 2,6-diisocyanate, toluene-2:4:6-triisocyanate, monochlorobenzene-2:4:6-triisocyanate, triphenylmethane-4:4′:4′-triisocyanate, 3,3′-dimethyl diisocyanate-biphenyl, 3.3′-dimethoxy-4.4′-diisocyanate-biphenyl, 1,5 naphthalene diisocyanate, 1,4-cyclohexylene diisocyanate, 4:4′-diisocyanate-3-methyldiphenyl methane, chlorophenyl-2,4-diisocyanate, dianisidine diisocyanate, trimethylene diisothiocyanate, diphenylmethane diisothiocyanate, and the like.

The particular polyisocyanate selected for each individual polyurethane foam-producing mixture is, in general, dependent to a considerable extent on its reaction rate and the properties which it imparts to the final foamed product. For example, the use of a relatively slow-reacting aliphatic diisocyanate, such as hexamethylene diisocyanate, can be advantageous in preventing excessive exotherm or excessive hardening of the polyurethane prior to the formation of good cell structure. Also, the careful selection of a polyisocyanate of particular functionality or a mixture of polyisocyanate, e.g., a di- and tri-functional isocyanate, and careful attention to the properties imparted by such isocyanates are advantageous in controlling the flexibility of the final foamed product. Because of the more numerous branching and cross-linking sites, generally the higher the functionality of the isocyanate employed, the more rigid is the final polyurethane foamed product. Other factors, such as low cost, low toxicity, and ease of handling, which are characteristic of the aromatic polyisocyanates such as the various toluene diisocyanate isomers, also determine to a great extent the selection of the particular isocyanate used.

Any organic polyol compound having a hydroxyl functionality of two or more per molecule, that is, two or more hydroxyl groups which react with a polyisocyanate to form a urethane polymer, can be employed. The polyol can be a compound such as glycerol, ethylene glycol, butylene glycol, trimethylolpropane, butanediol, sorbitol, 1,2,6-hexanetriol, N,N,N',N'-tetrakis-(2-hydroxypropyl) ethylene diamine (Quadrol), triethanol amine, and the like, or a higher molecular weight polymeric polyol such as a polyglycol, polyhydroxyl polyester, polyhydroxyl polyesteramide, polyhydroxyl polyether oils, and the like. A particularly preferred polyol is trimethylolpropane, a trifunctional polyhydroxy compound which has a melting point of about 58 degrees centigrade.

Illustrative of the polyglycols are polyalkylene glycols such as polyethylene glycol, polypropylene glycol, polybutylene glycol, and the like.

As examples of polyesters that can be used, there can be mentioned the reaction products of a dihydric alcohol such as ethylene glycol, diethylene glycol, tetraethylene glycol, 1,2-propylene glycol, dipropylene glycol, and the like, or a higher polyhydric alcohol such as glycerol, trimethylolethane, trimethylolpropane, pentaerythritol, mannitol, and the like, or mixtures of two or more of the alcohols, and a polycarboxylic acid or anhydride such as succinic, adipic, glutaric, malonic, sebacic, azelaic, phthalic, terephthalic, and isophthalic acids or their anhydrides. Mixtures of the acids and the anhydrides can be employed.

The polyhydroxyl polyesteramides useful for the purposes of the present invention can be any of those employed in the polyurethane foam art. Illustrative of these polymeric materials are the reaction products of a polyhydric alcohol, a dicarboxylic acid, examples of both of which have been mentioned above, and, as necessary, diamines or aminoalcohols such as ethylene diamine, hexamethylene diamine, phenylene diamine, benzidine, and monoethanolamine.

Illustrative of the polyhydroxy polyethers which can be employed are linear hydroxyl-terminated polymers and copolymers of cyclic ethers such as ethylene oxide, epichlorohydrin, 1:2-propylene oxide, oxacyclobutane, and tetrahydrofuran or branched polyethers obtained from the condensation of the aforementioned ethers with branched polyhydroxy compounds such as glycerol, 1,1,1-trimethylolpropane, pentaerythritol, sorbitol, sucrose, and the like. Mixtures of linear and branched polyethers, or mixtures of polyesters and polyethers, can also be employed if desirable.

Other polyhydroxyl materials, for example, esters of hydroxy carboxylic acids, such as castor oil, glycerol monoricinoleate, and the like, can also be used for the purposes of this invention.

The ultimate selection of any polyol for each individual use depends upon a variety of factors such as its reactivity and the physical characteristics desired in the final foamed product. A more flexible foam can be obtained by the use of a diol, while the more highly branched polyols of a hydroxyl functionality greater than two impart more rigid characteristics for the final foamed product. Such properties as density, degree of flexibility, etc., can be controlled and varied to a great extent by employing mixtures of the polyols.

As more fully disclosed in the prior art, in place of the aforementioned polyols and polyisocyanates, there can be used semi-prepolymers obtained by the reaction of the polyols and polyisocyanates in which either is used in excess of the other, resulting in a product having either reactive isocyanate or reactive hydroxyl groups. Further reaction with additional polyol or polyisocyanate, depending on the reactive groups present in the semi-prepolymer, then takes place during the final foaming steps.

The sodium borohydride which is reacted with the polyol in the process of this invention can be dissolved first in a relatively non-volatile solvent such as N-methyl-2-pyrrolidone, pyridine, acetonitrile, and the like, and the resulting solution subsequently mixed with the other components. Preferably, however, the sodium borohydride is utilized in the form of small solid particles or granules, particularly when the reaction occurs under pressures considerably below atmospheric pressure, since it is completely stable at temperatures under 300 degrees centigrade and decomposes only slowly at about 400 degrees centigrade under reduced pressures. Furthermore, since 2.37 liters of cell-forming hydrogen gas is evolved from each gram of sodium borohydride, the volume of gas produced per weight of starting material is extremely large, and consequently relatively little sodium borohydride is required to react with the polyol.

A wide variety of additional materials can be employed in the practice of this invention. Illustrative of these materials are catalysts for the polyurethane-forming reaction, such as the amines, preferably the tertiary amines, for example, triethylamine, triethylenediamine, N-methyl morpholine, pyridine, and the like; the tertiary phosphines, for example, triethyl and tripropyl phosphines and the like; and metal salts, for example, stannous octoate, dibutyl tin dilaurate, sodium methyl siliconate, iron acetyl acetonate, cobalt naphthenate, zinc stearate, dibutyl tin oxide, sodium salicylate, and the like. Other additives, such as cobalt chloride, which reacts with the sodium borohydride to form cobalt boride, which then catalyzes the reaction of the polyol with sodium borohydride, can be incorporated into the reactive mixture of this invention. Finely-divided materials including pigments, dyestuffs, and fillers, for example, silica gel, fuller's earth, metal powders such as aluminum, calcium carbonate, carbon black, aluminum oxide, and the like; foam-controlling agents, for example, surfactants such as silicone-glycol copolymers, fire-retarding agents such as tri-($\beta$-chloroethyl) phosphate, emulsifying agents, thickening agents, etc., can also be added if desired.

The ingredients employed in the process of this invention can be mixed in any suitable order and manner which produces a substantially homogeneous composition prior to any appreciable reaction of the materials. Although in some instances the ingredients can be mixed by hand, for example, when relatively slow-reacting materials are employed, preferably, the compositions are homogenized quickly with a mixing and blending apparatus such as a Waring Blendor and the like, particularly when rapidly-reacting materials are present in the mixture. The resultant mixture is then placed in an appropriate mold or form if such is used. In some instances, apparatus which mixes the components and immediately ejects the mixture into a mold can be utilized.

Any of the aforementioned polyols, polyisocyanates, and sodium borohydride can be blended together at the same time and allowed to react immediately in the so-called "one-shot" polyurethane foaming technique. In some cases, it is desirable to mix the non-reactive ingredients together prior to the beginning of the foaming reaction. Thus, for example, two mixtures can be produced, one comprising the polyol and various catalysts, surfactants, etc., and the other comprising the polyisocyanate and the sodium borohydride in either a solid or dissolved form; and subsequently mixed to effect the aforedescribed polyurethane-foam-producing dual reactions between the polyol and the polyisocyanate, and the polyol and the sodium borohydride.

There can also be employed alternate orders or methods of mixing the ingredients. For example, the polyol can first be reacted with an excess of the polyisocyanate to produce a semi-prepolymer or prepolymer having an excess of reactive isocyanate groups. This prepolymer is then mixed with additional separate quantities of polyol and sodium borohydride to effect the dual polyurethane-form-producing reactions.

A particularly useful procedure for mixing the ingredients is to first encapsulate one or more of the reactive materials to prevent their contact and consequent reaction with other materials in the mixture, then homogeneously blend the encapsulated materials with the remaining ingredients to produce a stable, potentially-reactive mixture, as fully described and claimed in copending United States patent application Ser. No. 365,167, of Robert A. Yoncoskie et al., filed of even date, the disclosure of which is hereby incorporated by reference. Contact of the encapsulated ingredients with the remaining materials in the resultant homogeneous mixture occurs upon their subsequent release from the capsules.

During the blending of the ingredients to form a substantially homogeneous mixture, the polyol contacts each of the polyisocyanate and the sodium borohydride. Although generally this is insufficient to initiate the afore-described dual reaction of the polyol with each, the rate of both of the reactions can be increased by heating the mixture. The reaction of the polyol with the sodium borohydride also can be enhanced by describing the pH (acidity) of the mixture with the addition of an acidic catalyst; for example, oxalic acid, succinic acid, aluminum chloride, phosphorus pentoxide, and the like.

The proportions of the ingredients employed in this process can be varied over a wide range depending upon a number of considerations such as the particular ingredients used, the conditions, for example, temperature and pressure, under which the process is carried on, the desired physical properties, for example, density, resiliency, compressive strength, etc., of the final foamed product, and like parameters. An amount of polyol sufficient to react with both the polyisocyanate and the sodium borohydride is employed. However, the amount of polyol needed to react with the polyisocyanate is well known to the prior art and, along with the relatively small amount necessary for reacting with the sodium borohydride, is easily determined by one skilled in the compounding of polyurethane-foam producing compositions.

The amount of cell-forming hydrogen gas generated by the reaction of the polyol and the sodium borohydride is, of course, dependent upon the quantities of each reactant employed. In addition, when the sodium borohydride is utilized in the form of solid particles or granules, the rate of evolution of the hydrogen gas is dependent upon, in addition to the other factors such as pH, catalysts employed, etc., the size of these granules. In a unit weight of granules, the smaller the size, the greater the rate of gas evolution because of the larger exposed surface area of these smaller particles. This is advantageous in predetermining the amount of sodium borohydride required for a particular desired period of gas evolution; for example, a period substantially equal to the period during which the polyol and the polyisocyanate react. The continual gas production during the formation of the entire polyurethane structure prevents sagging or collapse of foam structure until it is completely formed. Under conditions of reduced pressure, an excess of the hydrogen-gas-generating ingredients, the polyol and the sodium borohydride, can be employed to compensate for the gas which escapes into the surrounding environmental vacuum. Generally, up to about ten percent, by weight, of the sodium borohydride, based upon the total weight of the sodium borohydride, the polyol, and the polyisocyanate, can be employed. Within this percentage range, preferably, granules of from about .001 to about .3 inch in diameter can be used.

The polyurethane foamed structures produced by the practice of the process of this invention are uniform multi-celled structures having a wide range in their final physical properties. The foamed structures can vary from flexible through semi-flexible to rigid, depending upon the ultimate utilization of each individual foamed product. Other properties, such as density, can also be controlled during the foam production to give final cellular products varying from between about two pounds to about twenty-five pounds per cubic foot.

The following illustrations are representative of the polyurethane-foam-producing process of this invention, but are not to be construed as in any way limiting.

Example I

A polyurethane foam was prepared by rapidly blending the following ingredients together and allowing them to react under a reduced pressure of about one millimeter of mercury and at a temperature of 120 degrees centigrade.

Composition: Parts
  Polymethylene polyphenylisocyanate [1] __grams__ 15
  Trimethylolpropane _____do____ 5
  Stannous octoate _____drops__ 2
  Powdered mixture of 92.5% sodium borohydride
    and 7.5% cobalt chloride _____grams__ .75

[1] A polyfunctional isocyanate, produced by the reaction of aniline and formaldehyde, followed by phosgenation, having the formula

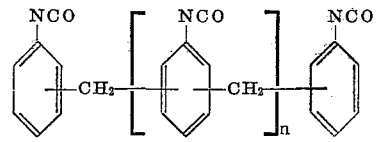

in which n varies from 0 to 3.

The dual reaction of the polyol with each of the polyisocyanate and the sodium borohydride produced a rigid polyurethane foam having a density of 3.75 pounds per cubic foot and a substantially uniform small cell size.

Example II

In this example, there were first prepared, according to the method disclosed in Example 6 of the aforementioned copending United States patent application of Robert A. Yoncoskie et al., capsules containing about 80 weight percent trimethylolpropane and about 20 weight percent of ethyl cellulose, the encapsulating wall material, and measuring about 200 to 800 microns in diameter.

The resulting capsules were then blended with the polyisocyanate and sodium borohydride mixture in the indicated proportions.

| Composition | Parts by weight (grams) | |
| --- | --- | --- |
| | A | B |
| Polymethylene polyphenylisocyanate | 60 | 200 |
| Sodium borohydride mixture of Example II | 6 | 17.8 |
| Trimethylolpropane capsules | 25 | 83.5 |

Each of the compositions was heated sufficiently to effect release of the trimethylolpropane through the capsule walls, as also fully described in the aforementioned copending United States patent application of Robert A. Yoncoskie et al., and initiate the dual reaction of the polyol with each of the polyisocyanate and sodium borohydride. Composition A, which was heated at atmospheric pressure, produced a strong, rigid polyurethane foam having a density of about eleven pounds per cubic foot. Composition B was heated under a reduced pressure of one millimeter of mercury and produced a rigid foam having a density of 8.8 pounds per cubic foot and a flexural strength of 97.7 p.s.i. as determined on the Tinius-Olsen testing machine.

As will be apparent to those skilled in the art, various other modifications can be carried out from the above disclosure without departing from the spirit and scope of the invention embodied within the claims.

What is claimed is:

1. A process of preparing a cellular polyurethane structure of uniform small cell size comprising mixing and reacting, (A) an organic polyol having a hydroxyl functionality of two or more per molecule each of which hydroxyl group is available to react with an organic polyisocyanate,
(B) an organic polyisocyanate, and
(C) up to about 10% of sodium borohydride as a blowing agent wherein the polyol reacts with both the organic polyisocyanate and the sodium borohydride, thereby generating hydrogen gas, in situ, to expand the polyurethane.

2. The process of claim 1 wherein there is incorporated during the mixing an amount of cobalt chloride sufficient to catalyze the reaction of the polyol and the sodium borohydride.

3. The process of claim 1 in which the sodium borohydride is in the form of solid particles.

4. The process of claim 1 in which the solid particles of borohydride are from about 0.001 to about 0.30 inch in diameter.

5. The process of claim 1 wherein the polyol is trimethylolpropane.

6. The process of claim 1 wherein the organic polyisocyanate and the sodium borohydride are mixed together prior to their mixing with the polyol.

References Cited

UNITED STATES PATENTS

| | | | |
|---|---|---|---|
| 2,758,980 | 8/1956 | Talalay et al. | 260—2.5 |
| 2,909,493 | 10/1959 | Bush | 260—2.5 |
| 3,084,127 | 4/1963 | Vakousky | 260—2.5 |
| 3,214,290 | 10/1965 | Larner et al. | 260—2.5 XR |

OTHER REFERENCES

Saunders et al., "Polyurethanes Chemistry and Technology," Part II, page 4, copy in Group 140.

DONALD E. CZAJA, *Primary Examiner.*

LEON J. BERCOVITZ, *Examiner.*

J. J. KLOCKO, G. W. RAUCHFUSS,
*Assistant Examiners.*

UNITED STATES PATENT OFFICE
CERTIFICATE OF CORRECTION

Patent No. 3,355,398                          November 28, 1967

Robert E. Kass

It is hereby certified that error appears in the above numbered patent requiring correction and that the said Letters Patent should read as corrected below.

Column 3, line 21, for "1,2-propylene" read -- 1,3-propylene --.

Signed and sealed this 31st day of December 1968.

(SEAL)
Attest:

Edward M. Fletcher, Jr.                       EDWARD J. BRENNER
Attesting Officer                                Commissioner of Patents